US011090861B2

(12) United States Patent
Graham et al.

(10) Patent No.: US 11,090,861 B2
(45) Date of Patent: Aug. 17, 2021

(54) SYSTEMS AND METHODS FOR LATERAL MATERIAL TRANSFER IN ADDITIVE MANUFACTURING SYSTEM

(71) Applicant: General Electric Company, Schenectady, NY (US)

(72) Inventors: Michael Evans Graham, Slingerlands, NY (US); William Thomas Carter, Galway, NY (US); John Broddus Deaton, Jr., Niskayuna, NY (US); John Joseph Madelone, Jr., South Glens Falls, NY (US); Thomas Charles Adcock, Glenville, NY (US); Matthias Hoebel, Windisch (CH); Subhrajit Roychowdhury, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 16/046,693

(22) Filed: Jul. 26, 2018

(65) Prior Publication Data

US 2020/0031042 A1    Jan. 30, 2020

(51) Int. Cl.
*B29C 64/153* (2017.01)
*B33Y 10/00* (2015.01)
(Continued)

(52) U.S. Cl.
CPC .......... *B29C 64/153* (2017.08); *B23K 26/342* (2015.10); *B28B 1/001* (2013.01);
(Continued)

(58) Field of Classification Search
CPC ................................................ B28B 1/001
See application file for complete search history.

(56) References Cited

U.S. PATENT DOCUMENTS 9,278,483 B2    3/2016   Wescott et al.
9,573,225 B2    2/2017   Buller et al.
(Continued)

FOREIGN PATENT DOCUMENTS

CN        105478769 A    4/2016
CN        206326260 U    7/2017
EP          2583774 A2    4/2013

OTHER PUBLICATIONS

International Search Report and Written Opinion, dated Oct. 8, 2019, for related International application No. PCT/US2019/042973 (14 pgs.).

(Continued)

*Primary Examiner* — Jacob T Minskey
*Assistant Examiner* — Virak Nguon
(74) *Attorney, Agent, or Firm* — Dority & Manning, P.A.

(57) ABSTRACT

An additive manufacturing system includes a build platform, a plurality of particles positioned on the build platform defining a build layer, a first and second region within the build layer, and at least one consolidation device. The first region and the second region each including a portion of the plurality of particles. The at least one consolidation device is configured to consolidate the plurality of particles within the build layer into a solid, consolidated portion of said build layer. The consolidation device is further configured to consolidate at least one of the plurality of particles within the build layer and the solid, consolidated portion of the build layer into a molten volume of transfer material. The consolidation device is further configured to transfer a portion of the molten volume of transfer material within the first region from the first region to the second region.

18 Claims, 4 Drawing Sheets

(51) Int. Cl.
*B33Y 30/00* (2015.01)
*B23K 26/342* (2014.01)
*B29C 64/20* (2017.01)
*B29C 64/393* (2017.01)
*B28B 1/00* (2006.01)
*B33Y 50/02* (2015.01)
*C03B 19/01* (2006.01)

(52) U.S. Cl.
CPC ............ *B29C 64/20* (2017.08); *B29C 64/393* (2017.08); *B33Y 10/00* (2014.12); *B33Y 30/00* (2014.12); *B33Y 50/02* (2014.12); *C03B 19/01* (2013.01)

(56) References Cited

U.S. PATENT DOCUMENTS

| | | | |
|---|---|---|---|
| 2013/0105447 A1* | 5/2013 | Haake | B23K 35/0244 219/76.14 |
| 2013/0108460 A1 | 5/2013 | Szwedowicz et al. | |
| 2014/0163717 A1* | 6/2014 | Das | B33Y 10/00 700/119 |
| 2015/0037599 A1 | 2/2015 | Blackmore | |
| 2015/0090074 A1 | 4/2015 | Etter et al. | |
| 2015/0198052 A1 | 7/2015 | Pavlov et al. | |
| 2015/0283642 A1* | 10/2015 | Forsdike | B22F 7/004 219/78.02 |
| 2016/0129502 A1 | 5/2016 | Varetti | |
| 2016/0151860 A1 | 6/2016 | Engeli et al. | |
| 2016/0158889 A1 | 6/2016 | Carter et al. | |
| 2016/0318129 A1 | 11/2016 | Hu | |
| 2016/0325541 A1 | 11/2016 | Lavrentyev et al. | |
| 2017/0106477 A1 | 4/2017 | Mironets et al. | |
| 2017/0120335 A1 | 5/2017 | Demuth et al. | |
| 2017/0197248 A1 | 7/2017 | Giulietti | |
| 2019/0232371 A1* | 8/2019 | Ladewig | B33Y 50/02 |

OTHER PUBLICATIONS

Tan, Jun Hao, Wai Leong Eugene Wong, and Kenneth William Dalgarno. "An overview of powder granulometry on feedstock and part performance in the selective laser melting process." Additive Manufacturing 18 (2017): 228-255.

Zhou, Xin, Yuan Zhong, Zhijian Shen, and Wei Liu. "The surface-tension-driven Benard conventions and unique sub-grain cellular microstructures in 316L steel selective laser melting." arXiv preprint arXiv:1801.01408 (2018).

Soszek, "Two novel additive processes to manufacture circuit boards: direct laser writing and direct electrostatic transfer and deposition", IEEE Transactions on Components, Hybrids, and Manufacturing Technology, vol. 12, Issue: 2, pp. 267-272, Jun. 1989.

Guijun et al., "Characterization of the process control for the direct laser metallic powder deposition", Surface and Coatings Technology, vol. 201, Issue: 6, pp. 2676-2683, Dec. 4, 2006.

* cited by examiner

SYSTEMS AND METHODS FOR LATERAL MATERIAL TRANSFER IN ADDITIVE MANUFACTURING SYSTEM

BACKGROUND

The subject matter described herein relates generally to additive manufacturing systems and, more particularly, to lateral material transfer in additive manufacturing systems.

At least some known additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and Laser-Cusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some DMLM systems, a recoat device is used to recoat the component with a uniform layer particulate material after each build layer is scanned by the laser beam. However, in at least some known systems, the recoat device may deposit a non-uniform layer of particulate material. Additionally, at least some components manufactured with DMLM systems may require a non-uniform deposition of particulate material to produce components with non-uniform features. For example, at least some components manufactured with DMLM systems may require a containment wall to prevent particulate material from sliding off the component. In order to consolidate the containment wall, a non-uniform deposition of particulate material around the edges of the component may be required.

BRIEF DESCRIPTION

In one aspect, an additive manufacturing system is provided. The additive manufacturing system includes a build platform, a plurality of particles positioned on the build platform defining a build layer, a first and second region within the build layer, and at least one consolidation device. The first region and the second region each including a portion of the plurality of particles. The at least one consolidation device is configured to consolidate the plurality of particles within the build layer into a solid, consolidated portion of said build layer. The at least one consolidation device is further configured to consolidate at least one of the plurality of particles within the build layer and the solid, consolidated portion of the build layer into a molten volume of transfer material. The at least one consolidation device is further configured to transfer a portion of the molten volume of transfer material within the first region from the first region to the second region.

In another aspect, a controller for use in an additive manufacturing system is provided. The additive manufacturing system includes at least one consolidation device configured to consolidate a plurality of particles on a build platform. The plurality of particles forms a build layer on the build platform to form a molten volume of transfer material. The build layer includes a first region and a second region. The controller includes a processing device and a memory device coupled to the processing device. The controller is configured to receive a build file. The build file defining a plurality of scan paths for a plurality of build layers The controller is also configured to control the consolidation device, based on the build file, to transfer a portion of the molten volume of transfer material from the first region to the second region.

In yet another aspect, a method of fabricating a component is provided. The method includes depositing a plurality of particles onto a build platform. The method also includes distributing the plurality of particles to form a build layer having a first region and a second region. The method further includes operating a consolidation device to melt a portion of the plurality of particles to form a molten volume of transfer material. The method also includes operating the consolidation device to transfer a portion of the molten volume of transfer material from the first region to the second region.

DRAWINGS

These and other features, aspects, and advantages of the present disclosure will become better understood when the following detailed description is read with reference to the accompanying drawings in which like characters represent like parts throughout the drawings, wherein.

Figure 1:
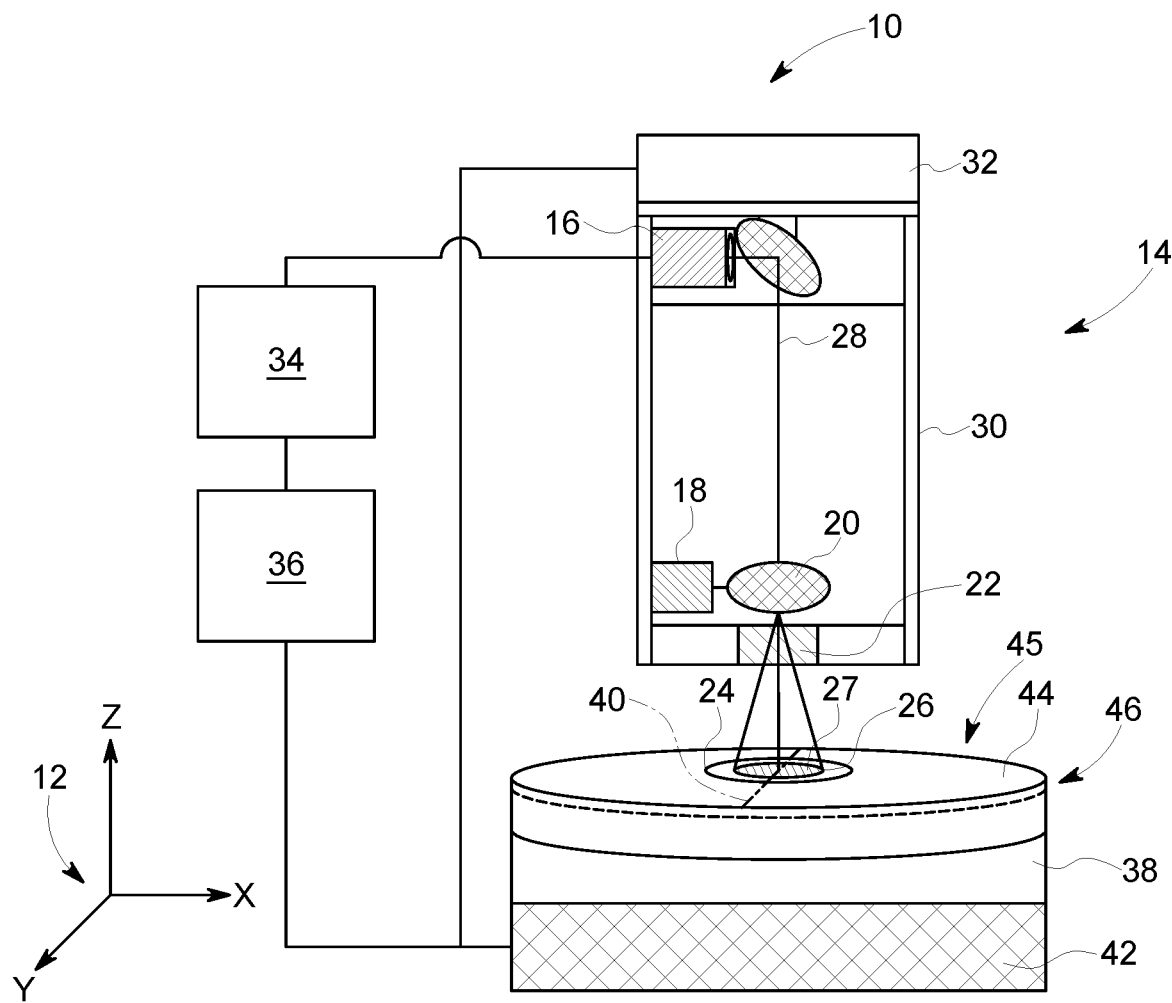
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Additionally, as used herein, the term "partially surrounds" refers to a structure (e.g., a particle containment wall) being located relative to a component such that the structure is capable of substantially containing a volume of particulates located around the component. In other words, the structure may partially surround the component if the structure is sufficient to contain a volume of particulates around the component. For example, if the structure is a continuous closed shape that encloses a volume, and the component is disposed within that volume, such a structure would surround the component. Alternatively, the structure may also "partially surround" the component, as that term is used in this application, in the embodiment where the structure does not entirely surround the component. A structure substantially contains a volume of particulate around the component wherein the particulate surrounding the component is lost at a rate less than new particulate is able to be deposited.

As used herein, the term "substantially particle-free region" refers to any non-constrained portion of a build platform wherein the number of particles deposited thereon is insubstantial enough that it is not intended to be used in a build process of an additive manufacturing system. In other words, a substantially particle-free region of a build platform may contain any quantity of particles resulting from spill-over of particles from within an additively manufactured structure and not constrained by a portion of the additive manufacturing system. However, a substantially particle-free region may not contain a sufficient quantity of particles such that the particles are intended to be used in the build process of an additive manufacturing system. Specifically, a substantially particle-free region may not contain a quantity of particles intended to be consolidated by a consolidation device to form a component in an additive manufacturing system.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling ProJet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

The systems and methods described herein include an additive manufacturing system configured to transfer a volume of molten powdered particles from a first region within a build layer to a second region. The additive manufacturing system includes a consolidation device configured to direct an energy beam across the build layer. The additive manufacturing system also includes a recoating device that spreads a plurality of particles over the build layer for the energy beam to consolidate into a layer of the component. The recoating device may not deposit a uniform layer of particles, forming regions of non-uniform material within the component. The consolidation device transfers material from the first region to the second region, by creating a surface tension gradient between the first and second regions. The surface tension gradient is created by creating a temperature gradient by repetitive laser re-melting. For example, the energy beam repetitively scans the first region, the second region, and a laser melting track extending therebetween creating the surface tension gradient and transferring molten material from the first region to the second region. Additionally, at least some components may require regions of non-uniform material. The additive manufacturing system described herein can transfer material laterally to create the non-uniform regions required by the component. The additive manufacturing systems described herein transfer material laterally using the consolidation device, correcting errors in situ and creating more complex components. As such, the additive manufacturing systems described herein correct errors, reduce material consumption, reduce energy consumption, and reduce the cost of manufacturing the component.

FIG. 1 is a schematic view of an exemplary additive manufacturing system 10. A coordinate system 12 includes an X-axis, a Y-axis, and a Z-axis. In the exemplary embodiment, additive manufacturing system 10 includes a consolidation device 14 including a laser device 16, a scanning motor 18, a scanning mirror 20, and a scanning lens 22 for fabricating a component 24 using a layer-by-layer manufacturing process. Alternatively, consolidation device 14 may include any component that facilitates consolidation of a material using any of the processes and systems described herein. Laser device 16 provides a high-intensity heat source configured to generate a melt pool 26 (not shown to scale) in a powder bed 27 of a powdered material using an energy beam 28. Laser device 16 is contained within a housing 30 that is coupled to a mounting system 32. Additive manufacturing system 10 also includes a computer control system, or controller 34.

Mounting system 32 is moved by an actuator or an actuator system 36 that is configured to move mounting system 32 in the X-direction, the Y-direction, and the Z-direction to cooperate with scanning mirror 20 to facilitate fabricating a layer of component 24 within additive manufacturing system 10. For example, and without limitation, mounting system 32 is pivoted about a central point, moved in a linear path, a curved path, and/or rotated to cover a portion of the powder on a build platform 38 to facilitate directing energy beam 28 along the surface of a plurality of particles 45 of a build layer 44 to form a layer of component 24 within a particle containment system 46. Alternatively, housing 30 and energy beam 28 are moved in any orientation and manner that enables additive manufacturing system 10 to function as described herein.

Scanning motor 18 is controlled by controller 34 and is configured to move mirror 20 such that energy beam 28 is reflected to be incident along a predetermined path along powder bed 27 or build platform 38, such as, for example, and without limitation, a linear and/or rotational scan path 40. In the exemplary embodiment, the combination of scanning motor 18 and scanning mirror 20 forms a two-dimension scan galvanometer. Alternatively, scanning motor 18 and scanning mirror 20 may include a three-dimension (3D) scan galvanometer, dynamic focusing galvanometer, and/or any other method that may be used to deflect energy beam 28 of laser device 16.

In the exemplary embodiment, build platform 38 is mounted to a support structure 42, which is moved by actuator system 36. As described above with respect to mounting system 32, actuator system 36 is also configured to move support structure 42 in a Z-direction (i.e., normal to a top surface of build platform 38). In some embodiments, actuator system 36 is also configured to move support structure 42 in the XY plane. For example, and without limitation, in an alternative embodiment where housing 30 is stationary, actuator system 36 moves support structure 42 in the XY plane to cooperate with scanning motor 18 and scanning mirror 20 to direct energy beam 28 of laser device 16 along scan path 40 about build platform 38. In the exemplary embodiment, actuator system 36 includes, for example, and without limitation, a linear motor(s), a hydraulic and/or pneumatic piston(s), a screw drive mechanism(s), and/or a conveyor system.

In the exemplary embodiment, additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, a build layer 44 of component 24 including a plurality of particles 45 to be consolidated by additive manufacturing system 10. In the exemplary embodiment, component 24 is modeled in a desired orientation relative to the origin of the coordinate system used in additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic computer build file (or files) is generated, including all of the layers. The build file is loaded into controller 34 of additive manufacturing system 10 to control the system during fabrication of each layer.

After the build file is loaded into controller 34, additive manufacturing system 10 is operated to generate component 24 by implementing the layer-by-layer manufacturing process, such as a direct metal laser melting method. The exemplary layer-by-layer additive manufacturing process does not use a pre-existing article as the precursor to the final component, rather the process produces component 24 from a raw material in a configurable form, such as particles 45. For example, and without limitation, a steel component can be additively manufactured using a steel powder. Additive manufacturing system 10 enables fabrication of components, such as component 24, using a broad range of materials, for example, and without limitation, metals, ceramics, glass, and polymers.

Figure 2:
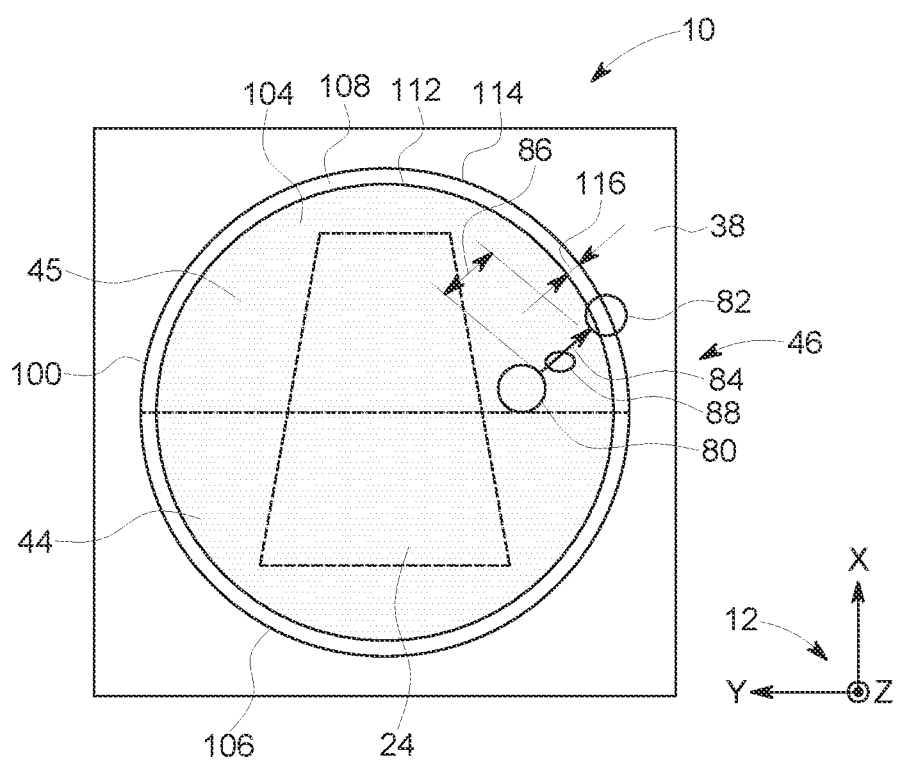
FIG. 2 is a plan schematic view of an exemplary particle containment system that may be used with the system shown in FIG. 1.

FIG. 2 is a plan schematic view of particle containment system 46 that may be used with additive manufacturing system 10 (shown in FIG. 1). In the exemplary embodiment, particle containment system 46 is configured to facilitate retaining particles 45 around component 24 to reduce the quantity of particles 45 required for operation of additive manufacturing system 10 and to facilitate improving the quality of component 24. The shape and arrangement of build platform 38, a first plurality 104 of particles 45, and particle containment system 46 are merely examples, and those of skill in the art will appreciate that build platform 38, first plurality 104 of particles 45, and particle containment system 46 may have any configuration that enables additive manufacturing system 10 to function as described herein.

In the exemplary embodiment, first plurality 104 of particles 45 are positioned on build platform 38 surrounding component 24. Particle containment system 46 is positioned on build platform 38 and includes a particle containment wall 100 at least partially surrounding particles 45. In the exemplary embodiment, particle containment wall 100 is generally circular and fully surrounds particles 45. In alternative embodiments, particle containment wall 100 may be any shape that facilitates operation of particle containment system 46 as described herein. In other alternative embodiments, particle containment wall 100 may surround a portion of particles 45 and may be coupled to any other wall or component that facilitates operation of additive manufacturing system 10 as described herein.

In the exemplary embodiment, particle containment wall 100 includes a second plurality 106 of particles 45 that have been joined together as part of the consolidation process described herein. Particle containment wall 100 extends along the Z-direction between build platform 38 and a top end 108 of particle containment wall 100. Particle containment wall 100 extends in an XY plane between an inner face 112 and an outer face 114 by a thickness 116. Inner face 112 is positioned against first plurality 104 of particles 45, and outer face 114 faces a substantially particle-free region and is positioned opposite inner face 112 and first plurality 104 of particles 45. Inner face 112 extends between build platform 38 and top end 108, and outer face 114 extends between build platform 38 and top end 108. In alternative embodiments, at least one of inner face 112 and outer face 114 is one of convex shaped and concave shaped. In further alternative embodiments, particle containment wall 100 may be tapered between build platform 38 and top end 108 such that thickness 116 of a first portion of particle containment wall 100 is greater than thickness 116 of a second portion of particle containment wall 100.

In the exemplary embodiment, particle containment wall 100 is substantially solid and is fabricated using a consolidation process using a consolidation device, such as consolidation device 14. Because particle containment wall 100 extends above build layer 44, second plurality 106 of particles 45 used to form particle containment wall 100 extend above build layer 44 in the Z-direction. During normal operations, a recoating device deposits particles 45 on and around component 24 in layers having a uniform thickness. In order to form particle containment wall 100, second plurality 106 of particles 45 requires a thickness that is greater than a thickness of build layer 44. Because the recoating device is configured to deposit a uniform build layer 44, consolidation device 14 is configured to transfer a molten portion of first plurality 104 of particles 45 to second plurality 106 of particles 45 to build up particle containment wall 100. Specifically, consolidation device 14 is configured to consolidate first plurality 104 of particles 45. Once first plurality 104 of particles 45 has been consolidated into either liquid or solid form, consolidation device 14 is configured to remelt the consolidated first plurality 104 of particles 45 to form a molten volume of first plurality 104 of particles 45 or a molten volume of transfer material. That is, consolidation device 14 may be configured to melt first plurality 104 of particles 45 directly into the molten volume of transfer material. Alternatively, consolidation device 14 may be configured to consolidate first plurality 104 of particles 45 into a solid, consolidated portion of build layer 44. After first plurality 104 of particles 45 has cooled into the solid, consolidated portion of build layer 44, consolidation device 14 may be configured to melt the solid, consolidated portion of build layer 44 (including first plurality 104 of particles 45) into the molten volume of transfer material. Consolidation device 14 is then configured to transfer the molten volume of transfer material to build up particle containment wall 100.

As shown in FIG. 2, consolidation device 14 is configured to transfer the molten volume of transfer material, designated as a first region 80 in FIG. 2, to a second region 82 containing a molten volume of second plurality 106 of particles 45, or a molten volume of stationary material, along a laser melting track 84. First plurality 104 of particles 45 within first region 80 is consolidated by consolidation device 14 and allowed to cool to a solid form. Consolidation device 14 then repetitively directs energy beam 28 over first region 80 to create the molten volume of transfer material. Consolidation device 14 transfers the molten volume of transfer material by repetitive laser re-melting along laser melting track 84. Repetitive laser re-melting creates a surface tension gradient along laser melting track 84 such that the molten volume of transfer material travels along laser melting track 84 from first region 80 to second region 82. The surface tension gradient is generated by selectively creating regions of higher temperature and regions of lower temperature within build layer 44. The regions of higher temperature have a lower surface tension than the regions of lower temperature. The Marangoni effect causes the molten material to flow from the region of lower surface tension (higher temperature region) to the region of higher surface tension (lower temperature region). The Marangoni effect is the mass transfer of material due to a gradient of surface tension. That is, repetitive laser re-melting creates a temperature gradient and a surface tension gradient along laser melting track 84 such that the Marangoni effect causes the molten volume of transfer material to flow from the region of lower surface tension (higher temperature region) to the region of higher surface tension (lower temperature region). Additionally, the surface tension gradient is also created by a recoil effect which occurs when energy beam 28 vaporizes a portion of the molten volume of transfer material, creating a cavity of missing material. The cavity of missing material draws in additional surrounding material which moves the material laterally along laser melting track 84. Specifically, the direction the molten volume of transfer material travels along laser melting track 84 is opposite the direction the direction that energy beam 28 travels during repetitive laser re-melting. As such, energy beam 28 increase the temperature of a region in front of the molten volume of transfer material along laser melting track 84 such that the region has a higher temperature and lower surface tension than the region with the molten volume of transfer material. The lower surface temperature draws the molten volume of transfer material into the region, transferring the molten volume of transfer material along laser melting track 84.

In the exemplary embodiment, consolidation device 14 repeatedly directs energy beam 28 over first region 80, second region 82, and laser melting track 84 such that the molten volume of transfer material within first region 80 has a first surface tension, the molten volume of stationary material within second region 82 has a second surface tension, and a volume of molten particles within laser melting track 84 has a variable surface tension. The first surface tension is less than the second surface tension. Variable surface tension is substantially equal to first surface tension proximate to first region 80 and substantially equal to second surface tension proximate to second region 82. That is, laser melting track 84 has a length 86 and the variable surface tension of the volume of molten particles within laser melting track 84 increases from first surface tension to second surface tension along length 86. The molten volume of transfer material is driven by the surface tension gradient (the Marangoni effect) to flow from first region 80 to second region 82 to form particle containment wall 100.

In an alternate embodiment, consolidation device 14 transfers the molten volume of transfer material over solid, consolidated portions of build layer 44, solid, consolidated portions of particle containment wall 100, and/or solid, consolidated portions of component 24. That is, in the alternative embodiment, consolidation device 14 does not transfer the molten volume of transfer material over powdered material such as powder bed 27. Specifically, consolidation device 14 builds up particle containment wall 100 by repetitive laser re-melting. For example, first region 80 may be an area immediately incident to inner face 112 and second region 82 may be an area immediately incident to outer face 114. In this configuration the surface tension gradient is configured to build up a lip of particle containment wall 100 by directing energy beam 28 from outer face 114 to inner face 112 along laser melting track 84.

Additionally, recoating device may deposit a non-uniform build layer 44. That is, an error may occur in the deposition process such that first region 80 contains more particles 45 than second region 82. Consolidation of the non-uniform build layer 44 would cause an unplanned, non-uniform build-up of material to be formed within component 24. Repetitive laser re-melting, as described above, maybe used to transfer the molten volume of transfer material along laser melting track 84 from first region 80 to second region 82 without stopping the additive manufacturing process to address a non-uniform build layer 44. That is, repetitive laser re-melting is used to in situ repair potential defects in a partially manufactured component 24 before the defects are formed within component 24, saving manufacturing time, material costs, and energy.

Additionally, a detection device may detect errors in the construction of component 24. Errors may occur in the consolidation process because of vaporization of the molten volume of transfer material such that first region 80 has a thickness greater than second region 82. Repetitive laser re-melting, as described above, may be used to melt consolidated particles 45 within first region 80, and transfer the molten volume of transfer material along laser melting track 84 from first region 80 to second region 82 without stopping the additive manufacturing process to address such errors. That is, repetitive laser re-melting is used to in situ repair defects in a partially manufactured component 24 before additional build layers 44 are consolidated on top of the error, saving manufacturing time, material costs, and energy.

The surface tension gradient is created by manipulation of scan paths of energy beam 28. Specifically, consolidation device 14 repeatedly directs energy beam 28 along laser melting track 84 such that the surface tension gradient drives the molten volume of transfer material to flow from first region 80 to second region 82. In a first pass along laser melting track 84, the molten volume of transfer material within first region 80 flow a first distance, shorter than length 86, along laser melting track 84. By repetitively directing energy beam 28 along laser melting track 84, the molten volume of transfer material within first region 80 will incrementally flow along laser melting track 84. In exemplary embodiment, first region 80 and second region 82 may be any regions within particle containment system 46. For example, first region 80 may be an area immediately incident to inner face 112 and second region 82 may be an area immediately incident to outer face 114. In this configuration the surface tension gradient is configured to build up a lip of particle containment wall 100. In alternative embodiments, first region 80 is shown as within particles 45 and second region 82 is shown as within particle containment wall 100.

Additionally, the power output that laser device 16 receives from a power supply system may be modulated as consolidation device 14 repeatedly directs energy beam 28 along laser melting track 84. A lower power level delivered to laser device 16 results in a lower intensity energy beam 28. Conversely, a higher power level delivered to laser device 16 results in a higher intensity energy beam 28. The intensity of energy beam 28 may be modulated along with repetitive passes along laser melting track 84 described above such that a surface tension gradient is created along laser melting track 84.

Figure 3:
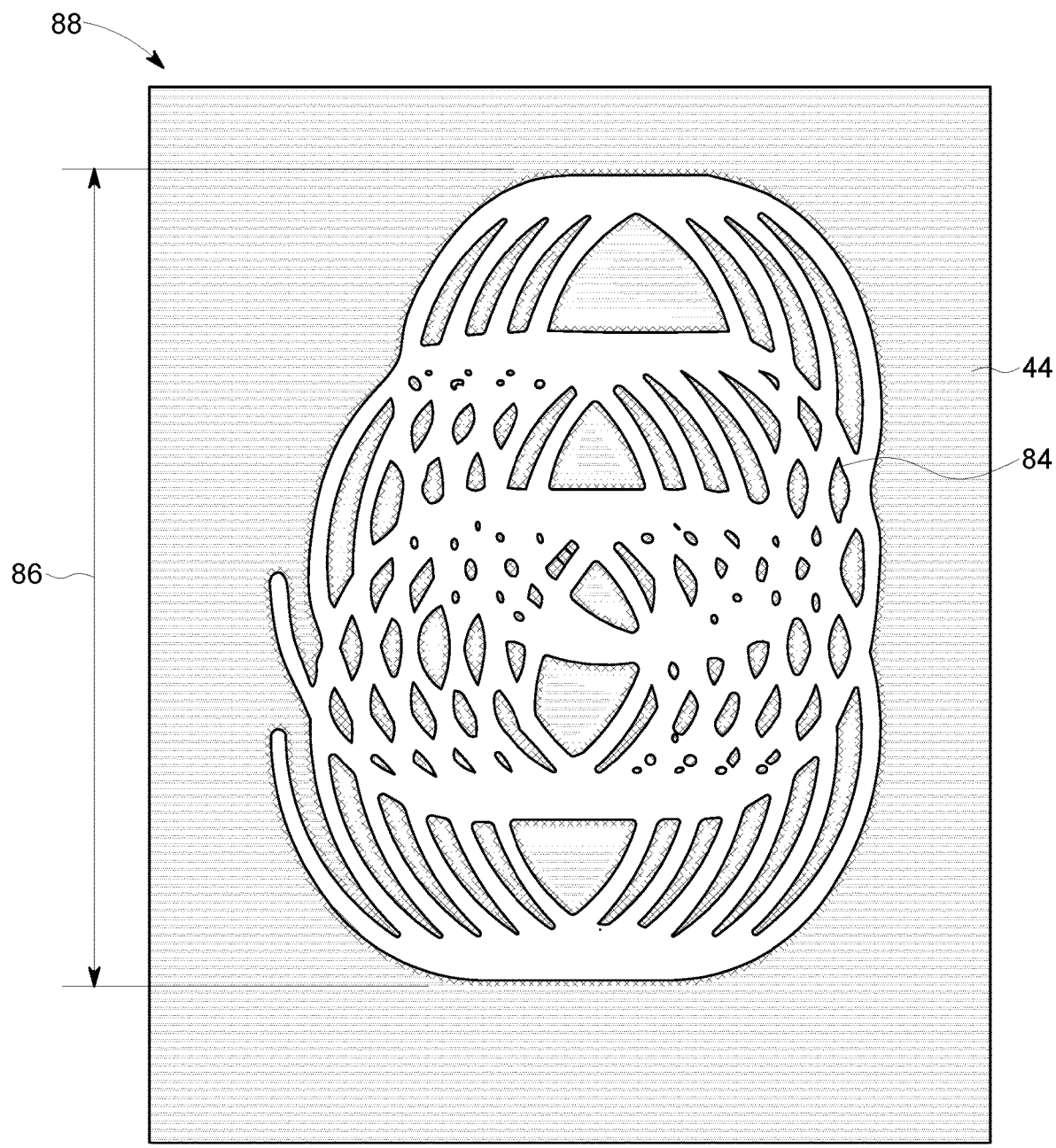
FIG. 3 is a schematic view of a section of a laser melting track on a build layer shown in FIG. 2.

Additionally, repetitive laser re-melting is not limited to repetitive passes along laser melting track 84 as described above. Rather, energy beam 28 may be directed in complex patterns or complex oscillations superimposed on along laser melting track 84. For example, FIG. 3 is a schematic view of a section 88 of laser melting track 84 on build layer 44. As shown, a position of energy beam 28 is modulated in a complex oscillation pattern. In the exemplary embodiment, the complex oscillation pattern includes a circular pattern superimposed on itself and repeated along length 86 of laser melting track 84. In alternative embodiments, the complex oscillation pattern may include any combination of frequency components superimposed on each other that enables additive manufacturing system 10 to operate as described herein. Oscillating a position of energy beam 28 along length 86 of laser melting track 84 creates a surface tension gradient that drives the molten volume of transfer material along laser melting track 84 from first region 80 to second region 82. The controlled superimposition of the scans creates a temperature differential which creates the surface tension gradient that provides the motive force for moving the molten volume of transfer material.

In an alternative embodiment, additive manufacturing system 10 includes a first consolidation device (not shown) and a second consolidation device (not shown) rather than a single consolidation device 14. The first consolidation device is configured to consolidate first plurality 104 of particles 45 within build layer 44 into the solid, consolidated portion of build layer 44. The second consolidation device is configured to consolidate at least one of first plurality 104 of particles 45 within build layer 44 and the solid, consolidated portion of the build layer 44 into the molten volume of transfer material. The second consolidation device is further configured to transfer a portion of the molten volume of transfer material within first region 80 from first region 80 to second region 82. That is, the first consolidation device is configured to build component 24 while the second consolidation device is configured to transfer material within build layer 44.

Figure 4:
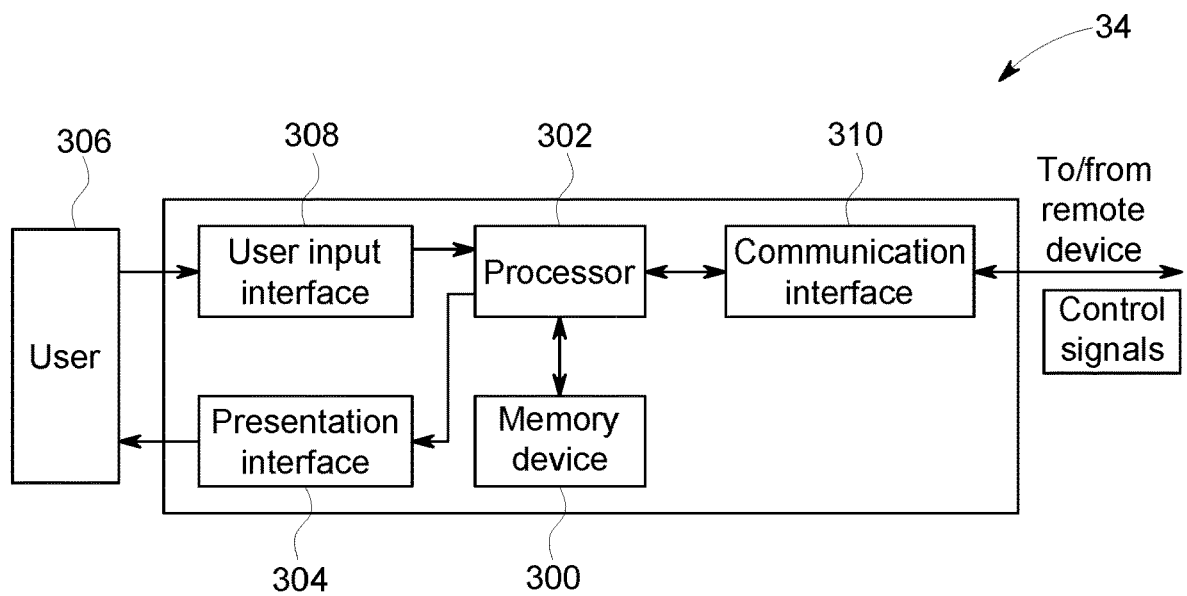
FIG. 4 is a block diagram of a controller that may be used to operate the additive manufacturing system shown in FIG. 1.

FIG. 4 is a block diagram of controller 34 that may be used to operate additive manufacturing system 10 (shown in FIG. 1). In the exemplary embodiment, controller 34 is any type of controller typically provided by a manufacturer of additive manufacturing system 10 to control operation of additive manufacturing system 10. Controller 34 executes operations to control the operation of additive manufacturing system 10 based at least partially on instructions from human operators. Controller 34 includes, for example, a 3D model of component 24 to be fabricated by additive manufacturing system 10. Operations executed by controller 34 include controlling power output of laser device 16 (shown in FIG. 1) and adjusting mounting system 32 and/or support structure 42, via actuator system 36 (all shown in FIG. 1) to control the scanning velocity of energy beam 28. Controller 34 is also configured to control scanning motor 18 to direct scanning mirror 20 to further control the scanning velocity of energy beam 28 within additive manufacturing system 10. Specifically, controller 34 is configured to control scanning motor 18 to direct scanning mirror 20 to further direct energy beam 28 along laser melting track 84 as described above. In alternative embodiments, controller 34 may execute any operation that enables additive manufacturing system 10 to function as described herein.

In the exemplary embodiment, controller 34 includes a memory device 300 and a processor 302 coupled to memory device 300. Processor 302 may include one or more processing units, such as, without limitation, a multi-core configuration. Processor 302 is any type of processor that permits controller 34 to operate as described herein. In some embodiments, executable instructions are stored in memory device 300. Controller 34 is configurable to perform one or more operations described herein by programming processor 302. For example, processor 302 may be programmed by encoding an operation as one or more executable instructions and providing the executable instructions in memory device 300. In the exemplary embodiment, memory device 300 is one or more devices that enable storage and retrieval of information such as executable instructions or other data. Memory device 300 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 300 may be configured to store any type of data, including, without limitation, build parameters associated with component 24. In some embodiments, processor 302 removes or "purges" data from memory device 300 based on the age of the data. For example, processor 302 may overwrite previously recorded and stored data associated with a subsequent time or event. In addition, or alternatively, processor 302 may remove data that exceeds a predetermined time interval. In addition, memory device 300 includes, without limitation, sufficient data, algorithms, and commands to facilitate monitoring of build parameters and the geometric conditions of component 24 being fabricated by additive manufacturing system 10.

In some embodiments, controller 34 includes a presentation interface 304 coupled to processor 302. Presentation interface 304 presents information, such as the operating conditions of additive manufacturing system 10, to a user 306. In one embodiment, presentation interface 304 includes a display adapter (not shown) coupled to a display device (not shown), such as a cathode ray tube (CRT), a liquid crystal display (LCD), an organic LED (OLED) display, or an "electronic ink" display. In some embodiments, presentation interface 304 includes one or more display devices. In addition, or alternatively, presentation interface 304 includes an audio output device (not shown), for example, without limitation, an audio adapter or a speaker (not shown).

In some embodiments, controller 34 includes a user input interface 308. In the exemplary embodiment, user input interface 308 is coupled to processor 302 and receives input from user 306. User input interface 308 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 304 and user input interface 308.

In the exemplary embodiment, a communication interface 310 is coupled to processor 302 and is configured to be coupled in communication with one or more other devices, such as laser device 16, and to perform input and output operations with respect to such devices while performing as an input channel. For example, communication interface 310 may include, without limitation, a wired network adapter, a wireless network adapter, a mobile telecommunications adapter, a serial communication adapter, or a parallel communication adapter. Communication interface 310 may receive a data signal from or transmit a data signal to one or more remote devices. For example, in some embodiments, communication interface 310 of controller 34 may transmit/receive a data signal to/from actuator system 36.

Presentation interface 304 and communication interface 310 are both capable of providing information suitable for use with the methods described herein, such as, providing information to user 306 or processor 302. Accordingly, presentation interface 304 and communication interface 310 may be referred to as output devices. Similarly, user input interface 308 and communication interface 310 are capable of receiving information suitable for use with the methods described herein and may be referred to as input devices.

Figure 5:
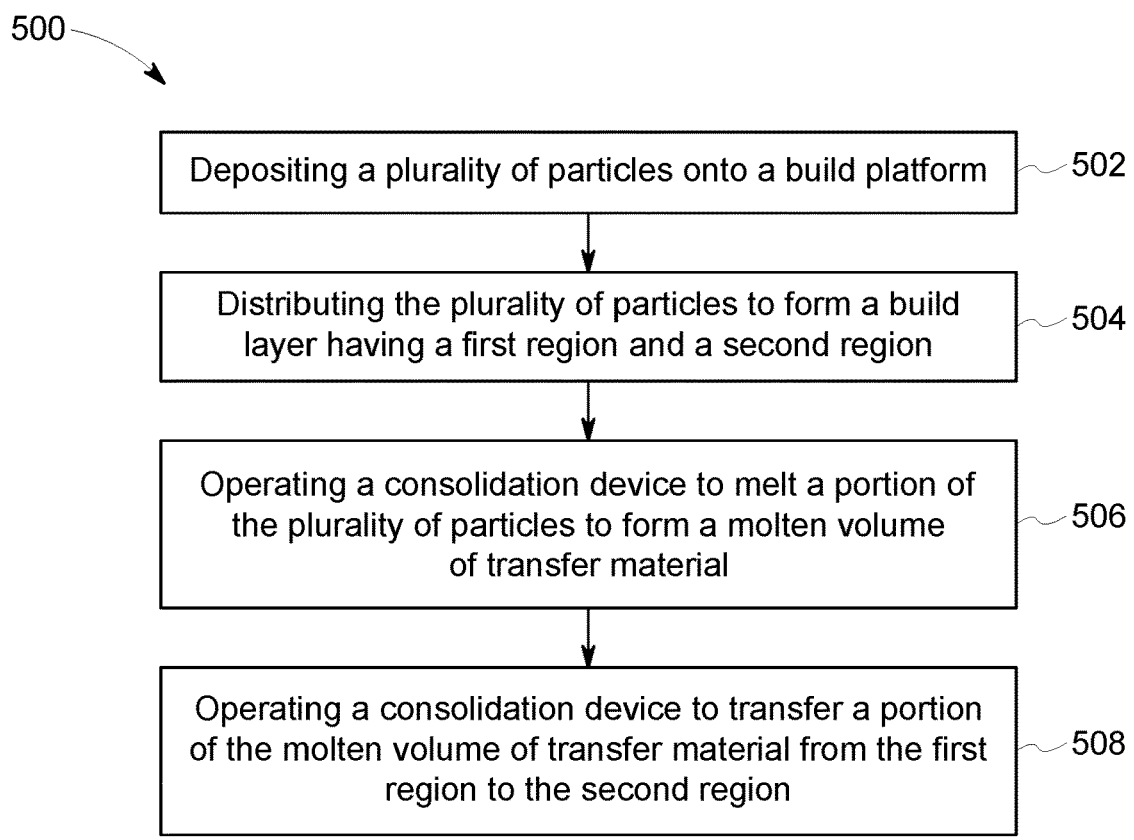
FIG. 5 is a flowchart of an exemplary method that may be used to fabricate a component using the additive manufacturing system shown in FIG. 1.

FIG. 5 is a flow chart illustrating a method 500 for fabricating component 24. Referring to FIGS. 1-5, method 500 includes depositing 502 a plurality of particles 45 onto a build platform 38. The method also includes distributing 504 the plurality of particles 45 to form a build layer 44 having a first region 80 and a second region 82. The method further includes operating 506 a consolidation device 14 to melt a portion of the plurality of particles 45 to form a molten volume of transfer material. The method also includes operating 508 the consolidation device 14 to transfer a portion of the molten volume of transfer material within the first region 80 along a laser melting track 84 to the second region 82.

The embodiments described herein include an additive manufacturing system configured to transfer molten material from a first region within a build layer to a second region. The additive manufacturing system includes a consolidation device configured to direct an energy beam across the build layer. The additive manufacturing system also includes a recoating device that spreads a plurality of particles over the build layer for the energy beam to consolidate into a layer of the component. The recoating device may not deposit a uniform layer of particles, forming regions of non-uniform material within the component. The consolidation device transfers molten material from the first region, to the second region, by creating a surface tension gradient between the first and second regions. The surface tension gradient is created by creating a temperature gradient by repetitive laser re-melting. For example, the energy beam repetitively scans the first region, the second region, and a laser melting track extending therebetween creating the surface tension gradient within a volume of molten material and transferring the volume of molten material from the first region to the second region. Additionally, at least some components may require regions of non-uniform material. The additive manufacturing system described herein can transfer material laterally to create the non-uniform regions required by the component. The additive manufacturing systems described herein transfer molten material laterally using the consolidation device, correcting errors in situ and creating more complex components. As such, the additive manufacturing systems described herein correct errors, reduce material consumption, reduce energy consumption, and reduce the cost of manufacturing the component.

An exemplary technical effect of the methods, systems, and apparatus described herein includes at least one of: a) transferring molten material laterally on a surface of a component, b) reducing the amount of particulate matter required for additively manufacturing a component, c) reducing the amount of energy required for additively manufacturing a component, and d) reducing the cost of additively manufacturing a component.

Exemplary embodiments of additive manufacturing systems configured to transfer material laterally are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
a build platform;
a plurality of particles positioned on said build platform defining a build layer;
a first region within said build layer and a second region within said build layer, said first region and said second region each including a portion of said plurality of particles; and
at least one consolidation device configured to consolidate said plurality of particles within said build layer into a solid, consolidated portion of said build layer, wherein said at least one consolidation device is further configured to consolidate at least one of said plurality of particles within said build layer and said solid, consolidated portion of said build layer into a molten volume of transfer material, said at least one consolidation device is further configured to transfer a portion of said molten volume of transfer material within said first region from said first region to said second region by repetitively directing an energy beam from said first region to said second region along a laser melting track to repetitively re-melt said portion of said molten volume of transfer material along said laser melting track.

2. The additive manufacturing system of claim 1, wherein said at least one consolidation device is configured to create a surface tension gradient between said first region and said second region along said laser melting track.

3. The additive manufacturing system of claim 1, wherein said at least one consolidation device is configured to create a first surface tension within said first region and a second surface tension within said second region, and wherein the second surface tension is greater than the first surface tension.

4. The additive manufacturing system of claim 3, wherein said at least one consolidation device is configured to create said first surface tension within said first region by directing the energy beam into said first region such that said molten volume of transfer material within said first region has a first temperature, wherein said at least one consolidation device is configured to create said second surface tension within said second region by directing the energy beam into said second region such that said molten volume of transfer material within said second region has a second temperature, and wherein the first temperature is different from the second temperature.

5. The additive manufacturing system of claim 4, wherein a temperature along said laser melting track varies from the first temperature to the second temperature.

6. The additive manufacturing system of claim 4, wherein a surface tension along said laser melting track varies from the first surface tension to the second surface tension.

7. The additive manufacturing system of claim 1, wherein said at least one consolidation device is configured to form a particle containment system around said plurality of particles.

8. The additive manufacturing system of claim 1, wherein said at least one consolidation device is configured to transfer said molten volume of transfer material on said build layer to form uniform material distribution in said build layer.

9. The additive manufacturing system of claim 1, wherein said at least one consolidation device comprises a first consolidation device and a second consolidation device, said first consolidation device is configured to consolidate said plurality of particles within said build layer into said solid, consolidated portion of said build layer, said second consolidation device is configured to consolidate at least one of said plurality of particles within said build layer and said solid, consolidated portion of said build layer into said molten volume of transfer material, said second consolidation device is further configured to transfer a portion of said molten volume of transfer material within said first region from said first region to said second region.

10. A controller for use in an additive manufacturing system including at least one consolidation device configured to consolidate a plurality of particles on a build platform to form a molten volume of transfer material, the plurality of particles forming a build layer on the build platform, the build layer including a first region and a second region, said controller including a processing device and a memory device coupled to said processing device, said controller configured to:
- receive a build file defining a plurality of scan paths for a plurality of build layers; and
- control the consolidation device, based on the build file, to transfer a portion of the molten volume of transfer material from the first region to the second region by repetitively directing an energy beam from the first region to the second region along a laser melting track to repetitively re-melt the portion of the molten volume of transfer material along the laser melting track.

11. The controller in accordance with claim 10, wherein said controller is configured to control the consolidation device including a laser device configured to emit the energy beam.

12. The controller in accordance with claim 10, wherein said controller is configured to control the consolidation device in a complex oscillation pattern along the laser melting track.

13. The controller in accordance with claim 12, wherein the complex oscillation pattern is a circular pattern superimposed on itself and repeated along a length of the laser melting track.

14. A method of fabricating a component, said method comprising:
- depositing a plurality of particles onto a build platform;
- distributing the plurality of particles to form a build layer having a first region and a second region;
- operating a consolidation device to melt a portion of the plurality of particles to form a molten volume of transfer material; and
- operating the consolidation device to transfer a portion of the molten volume of transfer material from the first region to the second region by repetitively directing an energy beam from the first region to the second region along a laser melting track to repetitively re-melt the portion of the molten volume of transfer material along the laser melting track.

15. The method in accordance with claim 14, wherein operating the consolidation device includes creating a surface tension gradient between the first region and the second region along the laser melting track.

16. The method in accordance with claim 15, wherein creating the surface tension gradient includes creating a temperature gradient between the first region and the second region along the laser melting track.

17. The method in accordance with claim 14, wherein operating the consolidation device to melt the portion of the plurality of particles to form the molten volume of transfer material comprises operating the consolidation device to melt a portion of the plurality of particles directly into the molten volume of transfer material.

18. The method in accordance with claim 14, further comprising operating the consolidation device to melt the portion of the plurality of particles to form a solid, consolidated portion of the component, wherein operating the consolidation device to melt the portion of the plurality of particles to form the molten volume of transfer material comprises operating the consolidation device to melt a portion of the solid, consolidated portion of the component to form the molten volume of transfer material.

* * * * *